US012221900B2

(12) United States Patent
Duan et al.

(10) Patent No.: US 12,221,900 B2
(45) Date of Patent: Feb. 11, 2025

(54) STATIONARY TURBINE BLADE AND STEAM TURBINE

(71) Applicant: MITSUBISHI HEAVY INDUSTRIES, LTD., Tokyo (JP)

(72) Inventors: Chongfei Duan, Tokyo (JP); Shunsuke Mizumi, Tokyo (JP); Soichiro Tabata, Yokohama (JP); Koji Ishibashi, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/096,129

(22) Filed: Jan. 12, 2023

(65) Prior Publication Data

US 2023/0167746 A1 Jun. 1, 2023

Related U.S. Application Data

(63) Continuation of application No. PCT/JP2021/025171, filed on Jul. 2, 2021.

(30) Foreign Application Priority Data

Aug. 12, 2020 (JP) ................................ 2020-136246

(51) Int. Cl.
*F01D 9/02* (2006.01)
*F01D 5/14* (2006.01)
(Continued)

(52) U.S. Cl.
CPC ............... *F01D 9/02* (2013.01); *F01D 25/24* (2013.01); *F05D 2240/14* (2013.01)

(58) Field of Classification Search
CPC .......... F01D 25/32; F01D 25/24; F01D 9/041; F01D 5/147; F01D 5/141; F01D 9/02;
(Continued)

(56) References Cited

U.S. PATENT DOCUMENTS 8,132,414 B2 * 3/2012 Niizeki .................. F01D 5/288
416/241 A
2007/0101719 A1 5/2007 Niizeki et al.
2017/0167301 A1 6/2017 Fandrei, II

FOREIGN PATENT DOCUMENTS

JP 01080705 A * 3/1989 ............. F01D 25/32
JP 2007-120478 5/2007
(Continued)

OTHER PUBLICATIONS

Machine Translation of JP-01080705-A [retrieved on Mar. 1, 2024]. Retrieved from: Espacenet. (Year: 2024).*
(Continued)

*Primary Examiner* — Eric J Zamora Alvarez
(74) *Attorney, Agent, or Firm* — Wenderoth, Lind & Ponack, L.L.P.

(57) ABSTRACT

This stationary turbine blade comprises: a stationary blade main body extending in the radial direction intersecting the flow direction of steam; a hydrophilic region which is formed on the surface of the stationary blade main body and which has a higher hydrophilicity than the other parts and has the radial dimension gradually increasing toward the downstream side in the flow direction; and a collecting portion which is provided on the downstream side of the hydrophilic region and which collects a liquid film flowing along the hydrophilic region.

10 Claims, 6 Drawing Sheets

(51) Int. Cl.
*F01D 5/28* (2006.01)
*F01D 25/24* (2006.01)
*F01D 25/32* (2006.01)

(58) Field of Classification Search
CPC . F01D 5/18; F01D 5/145; F01D 5/286; F01D 5/28; F01D 5/288; F01D 9/065; F01D 1/00; F01D 5/14; F01D 5/188; F05D 2220/31; F05D 2260/602; F05D 2300/51; F05D 2240/123; F05D 2230/10; F05D 2240/122; F05D 2240/12; F05D 2240/14; F05D 2300/512; F05D 2260/608; F05D 2260/95
See application file for complete search history.

(56) References Cited

FOREIGN PATENT DOCUMENTS

| | | |
|---|---|---|
| JP | 2007-309235 | 11/2007 |
| JP | 2017-106451 | 6/2017 |

OTHER PUBLICATIONS

International Search Report issued Sep. 7, 2021 in International Application No. PCT/JP2021/025171, with English translation.
Written Opinion of the International Searching Authority issued Sep. 7, 2021 in International Application No. PCT/JP2021/025171, with English translation.

* cited by examiner

STATIONARY TURBINE BLADE AND STEAM TURBINE

TECHNICAL FIELD

The present disclosure relates to a turbine stator blade and a steam turbine.

This application claims priority of Japanese Patent Application No. 2020-136246 filed in Japan on Aug. 12, 2020.

Priority is claimed on Japanese Patent Application No. 2020-136246, filed Aug. 12, 2020, and this application is a continuation application based on a PCT Patent Application No. PCT/JP2023/025171. The content of the PCT Application is incorporated herein by reference.

BACKGROUND ART

A steam turbine includes: a rotating shaft that is rotatable around an axis; a plurality of turbine rotor blade rows that are arranged on an outer peripheral surface of the rotating shaft at intervals in an axis direction; a casing that covers the rotating shaft and the turbine rotor blade rows from in a an outer peripheral side; and a plurality of turbine stator blade rows that are supported in a radial direction by an inner ring and an outer ring on an inner peripheral aide of the casing. Each turbine rotor blade row has a plurality of rotor blades arranged in a circumferential direction of the rotating shaft, and each turbine stator blade row has a plurality of stator blades arranged in the circumferential direction of the rotating shaft. The turbine rotor blade row is disposed adjacent to the turbine stator blade row on a downstream side in the axis direction to form one stage. An intake port connected to an inlet pipe that takes in steam from the outside is formed on an upstream side of the casing, and an exhaust hood is formed on a downstream side. Steam generated by a boiler flows into the turbine after a pressure and a temperature thereof are regulated by some regulating valves and a flow rate thereof is regulated by a turbine inlet valve. The high-temperature and high-pressure steam taken in from the inlet pipe is converted into a rotational force of the rotating shaft by the turbine rotor blade rows after a flow direction and a speed thereof are regulated by the turbine stator blade rows.

The steam passing through the turbine loses energy as the steam goes from an upstream side to the downstream side, and the temperature (and pressure) thereof drops. In particular, a steam turbine for thermal power generation is generally composed of a high-pressure turbine, a medium-pressure turbine, and a low-pressure turbine. Two stages (a pair of a turbine stator; blade row and a turbine rotor blade row) counting from the most downstream side of the low-pressure turbine provide a gas-liquid two-phase flow environment. Therefore, in the stage on the most downstream side, a portion of the steam is liquefied and exists in an air flow as fine droplets (water droplets), and a portion of the droplets adheres to a surface of the turbine stator blade. The droplets exist on the surface of the turbine stator blade from the upstream side to the downstream side, and the droplets are aggregated on the surface of the blade and grow to form a liquid film. The liquid film is constantly exposed, to a high-speed steam flow. When the liquid film further grows and increases in thickness, a portion of the liquid film is torn off by the steam flow, or the liquid film that remains adhering to the stator blade scatters downstream from a trailing edge of the stator blade and scatters toward the downstream side as coarse droplets. The scattering droplets flow toward the downstream side while gradually accelerating due to the steam flow. Since the larger the droplet sire is, the larger the inertial force is, the droplets cannot ride on the steam flow and pass between the turbine rotor blades, and collide with the turbine rotor blade. A circumferential speed of the turbine rotor blade increases toward a tip side and may exceed a speed of sound. Therefore, in a case where the scattering droplets collide with the turbine rotor blade, erosion may occur on the surface of the turbine rotor blade. In addition, the collision of the droplets may hinder rotation of the turbine rotor blade, resulting in braking loss.

Various techniques have hitherto been proposed in order to prevent the adhesion and growth of such droplets. For example, in an apparatus described in PTL 1 below, an extraction port for auctioning a liquid film is formed on a surface of a turbine stator blade, and a hydrophilic removal surface extending from a leading edge side of the turbine stator blade toward the extraction port is formed. The removal surface is configured to have a width (radial dimension) gradually decreasing from an upstream side to a downstream side. In other words, as the width decreases, an area of the hydrophilic removal surface decreases. It is assumed that after the liquid film moves along the removal surface, the liquid film can be auctioned by the extraction port.

CITATION LIST

Patent Literature

[PTL 1] Japanese Unexamined Patent Application Publication No. 2017-106451

Summary of Invention

Technical Problem

However, as in PTL 1, in a case where the width of the removal surface decreases toward the downstream side, the liquid film is concentrated in a region of the removal surface narrowing toward the downstream side, and a thickness of the liquid film increases. In addition, in a case where a plurality of droplet flows (liquid veins) are formed in the removal surface, the plurality of liquid veins are concentrated toward the downstream side and join together, resulting in an increase in thickness of the liquid film. When the thickness of the liquid film upstream of the extraction port is increased in this way, the liquid film is more likely to be torn off by the steam flow, and there is a concern that the droplets may scatter toward the downstream side again. In addition, as the liquid film becomes thick, the liquid film is less likely to be auctioned into the extraction port, and the liquid film that has not been auctioned into the extraction port reaches the trailing edge of the stator blade downstream of the extraction port, so that the thickness of the liquid film that is accumulated at the trailing edge of the stator blade increases. As a result, there is a concern that a diameter of the droplets scattering downstream may increase, and the amount of the droplets may increase. That is, there is still room for improvement in the apparatus according to PTL 1.

The present disclosure has been made to solve the above problems, and an object thereof is to provide a turbine stator blade and a steam turbine capable of further reducing growth of a liquid film and facilitating efficient collection of the liquid film.

Solution to Problem

In order to solve the above problems, a turbine stator blade according to the present disclosure includes: a blade body extending in a radial direction Intersecting a flow direction of steam; a hydrophilic region that is formed on a surface of the blade body, has higher hydrophilicity than other portions, and has a radial dimension gradually increasing toward a downstream side in the flow direction; and a collecting portion that is provided on a downstream side of the hydrophilic region and that collects a liquid film flowing along the hydrophilic region.

Advantageous Effects of Invention

According to the present disclosure, it is possible to provide a turbine stator blade and a steam turbine capable of further reducing growth of a liquid film and facilitating efficient collection of the liquid film.

DESCRIPTION OF EMBODIMENTS

First Embodiment (Configuration of Steam Turbine)

Figure 1:
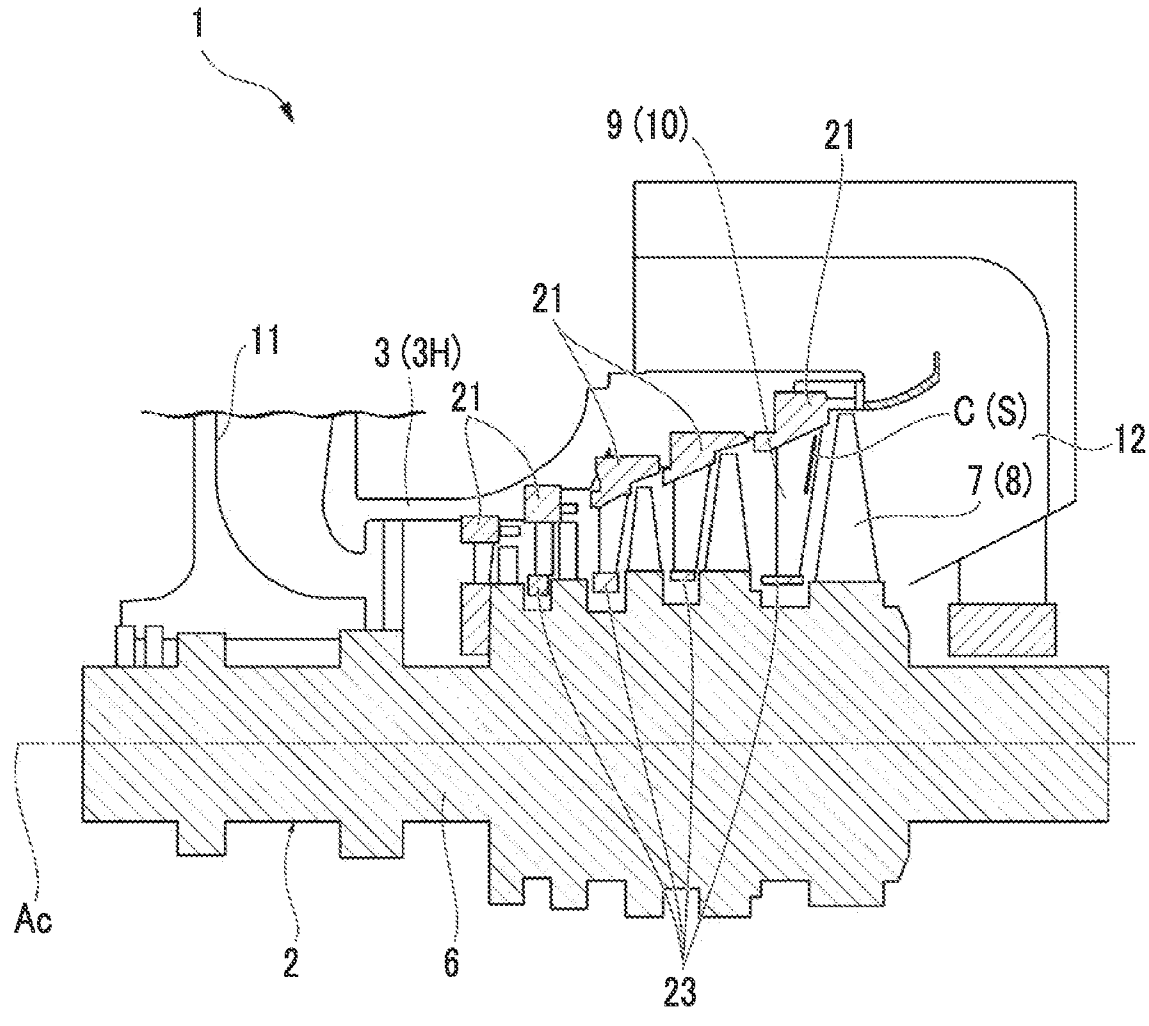
FIG. 1 is a schematic cross-sectional view showing a configuration of a steam turbine according to a first embodiment of the present disclosure.

Hereinafter, a steam turbine 1 (particularly, a low-pressure steam turbine) and a stator blade 10 (a turbine stator blade) according to a first embodiment of the present disclosure will be described with reference to FIGS. 1 and 2. As shown in FIG. 1, the steam turbine 1 includes a rotor 2 and a casing 3.

The rotor 2 has a rotating shaft 6 having a circular cross section extending along an axis Ac, and a plurality of rotor blade rows 7 provided on an outer peripheral surface of the rotating shaft 6. The rotating shaft 6 is rotatable around the axis Ac. The plurality of rotor blade rows 7 are arranged at intervals in an axis Ac direction. Each rotor blade row 7 has a plurality of rotor blades 8 arranged in a circumferential direction of the axis Ac. The rotor blade 8 extends radially outward from the outer peripheral surface of the rotating shaft 6. A detailed configuration of the rotor blade 8 will be described later.

The casing 3 has a casing body 3H that covers the rotor 2 from an outer peripheral side, and a plurality of stator blade rows 9 supported from the outer peripheral side and an inner peripheral side by an outer ring 21 (described later) and an inner ring 23 (described later) provided on an inner peripheral side of the casing body 3H. The casing body 3H has a tubular shape centered on the axis Ac. The plurality of stator blade rows 9 are arranged at intervals in the axis Ac direction. The steam turbine 1 includes the came number of rotor blade rows 7 as the stator blade rows 9, and one rotor blade row 7 is located between a pair of the stator blade rows 9 adjacent to each other in the axis Ac direction. That is, the rotor blade rows 7 and the stator blade rows 9 are alternately arranged in the axis Ac direction. One stator blade row 9 and one rotor blade row 7 form one "stage". Each stator blade row 9 has a plurality of stator blades 10 arranged, in the circumferential direction of the axis Ac. The stator blade 10 extends in a radial direction with respect to the axis Ac.

A steam flow path 11 for taking high-temperature and high-pressure steam guided from an inlet pipe into the stage of the casing body 3H is formed on one side of the casing body 3H in the axis Ac direction. An exhaust hood 12 responsible for collecting a pressure of the steam is provided on the other side of the casing body 3H in the axis Ac direction.

The steam that has flowed into the steam flow path 11 flows through the stages in the casing body 3H, then passes through the exhaust hood 12, and is sent to a condenser (not shown). In the following description, a side on which the steam flow path 11 is located as viewed from the exhaust hood 12 will be referred to as an upstream side in a flow direction of the steam. A side on which the exhaust hood 12 is located as viewed from the steam flow path 11 is referred to as a downstream side.

(Configuration of Rotor Blade)

Figure 2:
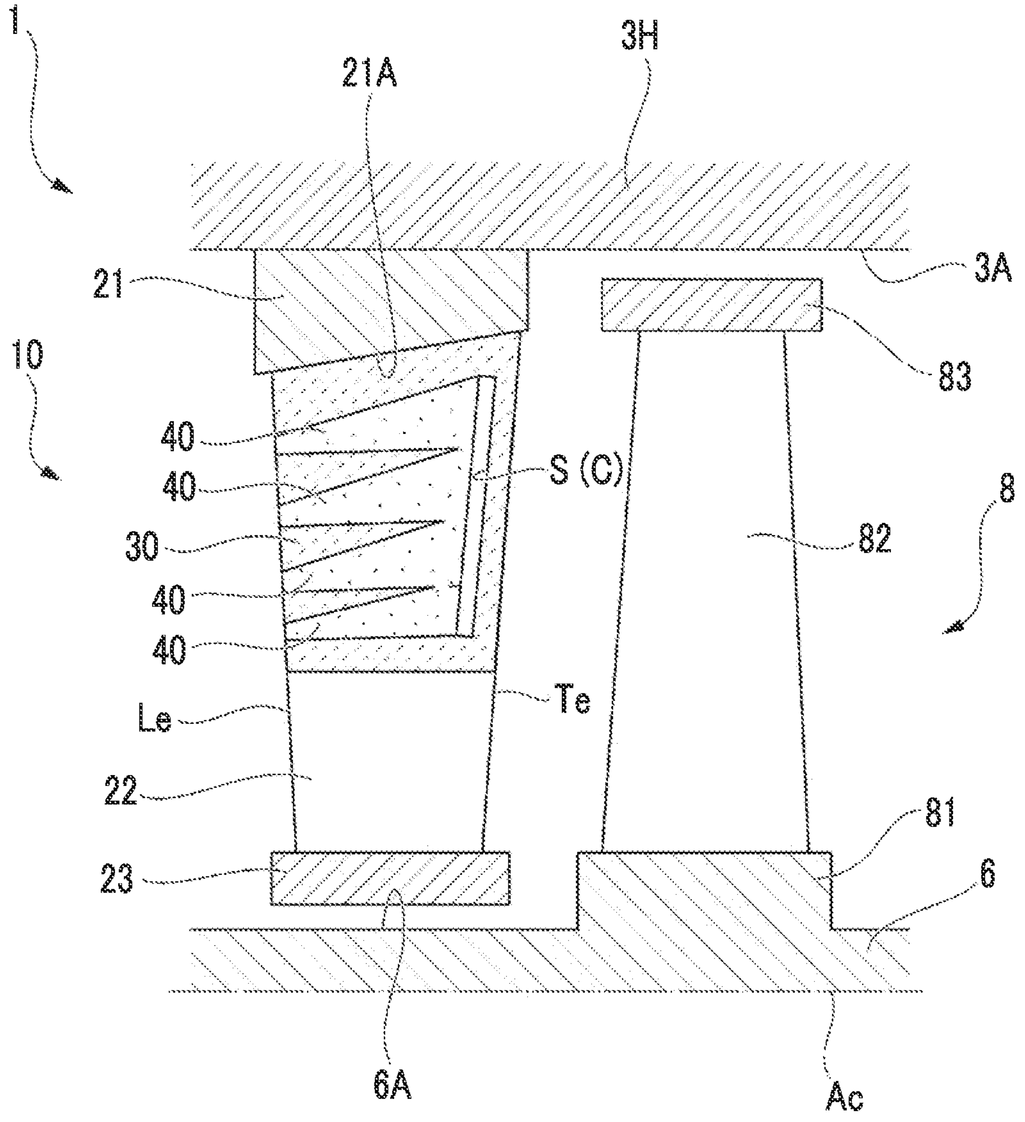
FIG. 2 is an enlarged cross-sectional view of a main part of the steam turbine according to the first embodiment of the present disclosure.

As shown in FIG. 2, the rotor blade 8 includes a platform 81, a rotor blade body 82, and a shroud 83. The platform 81 is installed on the outer peripheral surface of the rotating shaft 6 (rotating shaft outer peripheral surface 6A). The rotor blade body 82 is provided on an outer peripheral side of the platform 81. The rotor blade body 82 extends in the radial direction and has a blade-shaped cross-sectional shape when viewed in the radial direction. As an example, the rotor blade body 82 is formed so that a dimension in the axis Ac direction gradually decreases from an inner side to an outer side in the radial direction. The shroud 83 is provided at an end portion on a radially outer side of the rotor blade body 82. The shroud 83 has a substantially rectangular cross-sectional shape having the axis Ac direction as a longitudinal direction. An outer peripheral surface of the shroud 83 faces an inner peripheral surface (casing inner peripheral surface 3A) of the casing body 3H at an interval in the radial direction, (Configuration of Stator Blade)

The stator blade 10 has the outer ring 21, a stator blade body 22, and the inner ring 23. In addition, the stator blade body 22 has a water-repellent region 30, a hydrophilic region 40, and a slit S. The outer ring 21 has an annular shape centered on the axis Ac. The outer ring 21 is supported by the casing body 3H via a support member (not shown). The stator blade body 22 is fixed between the outer ring 21 and the inner ring 23. The stator blade body 22 extends radially inward from an outer ring inner peripheral surface 21A and has a blade-shaped cross-sectional shape when viewed in the radial direction. That is, the stator blade body 22 extends in a direction intersecting the flow direction of the steam. As an example, a dimension of the stator blade body 22 in the axis Ac direction gradually decreases from the outer side to the inner side in the radial direction. The inner ring 23 is provided at an end portion on a radially inner side of the stator blades body 22. The inner ring 23 has a substantially rectangular cross-sectional shape having the axis Ac direction as a longitudinal direction. An inner peripheral surface of the inner ring 23 faces the rotating shaft outer peripheral surface 6A at an interval in the radial direction.

The water-repellent region 30, the hydrophilic region 40, and the silt S are formed on a surface of the stator blade body 22 (more specifically, a surface facing the upstream side of both surfaces of the stator blade body 22 in a thickness direction: a pressure side). As an example, it is desirable that the water-repellent region 30 is formed from an outer periphery-side end portion of the stator blade body 22 to a region of about ½ to ⅔ in the radial direction. The water-repellent region 30 is formed over an entire region from an upstream-side end edge (leading edge Le) to a downstream-side end edge (trailing edge Te) of the stator blade body 22.

The water-repellent, region 30 has higher water repellency than the hydrophilic region 40 (described later) on the surface of the stator blade body 22. For example, the wafer-repellent region 30 is formed by subjecting the surface of the stator blade body 22 to fine processing for improving water repellency or by attaching a water-repellent sheet to the surface. When the water-repellent region 30 is formed in this way, a contact angle of an adhered droplet can be 90° or more. It is sufficient that, the water-repellent region 30 at least has a difference in hydrophilicity from the hydrophilic region 40. For this reason, it is also possible to adopt a configuration in which only the hydrophilic region 40 is formed on the surface of the stator blade body 22 and the water-repellent region 30 is not formed.

On a trailing edge Te side of the water-repellent region 30, the slit S is formed as a collecting portion C for collecting a liquid film that has flowed along the hydrophilic region 40, which will be described later. The slit S extends along the trailing edge Te. The slit 3 is one or more elongated holes communicating with an inside of the stator blade body 22. That is, the stator blade body 22 is hollow. It Is desirable that an internal space of the stator blade body 22 is brought into a negative pressure state by a device (not shown).

A plurality of (for example, four) the hydrophilic regions 40 are formed in a portion of the stator blade body 22 from the leading edge Le to the slit S. The hydrophilic region 40 has relatively high hydrophilicity compared to the above-mentioned water-repellent region 30 and to regions other than the water-repellent region 30. That is, in the hydrophilic region, the contact angle of the adhered droplet is smaller than a contact angle of a droplet adhering to the water-repellent region. Accordingly, the droplet a spread to fit into the surface of the hydrophilic region 40 and are held in a thin liquid film state.

In the present embodiment, the plurality of hydrophilic regions 40 are arranged in the radial direction. In addition, a width (that is, radial dimension) of each of the hydrophilic regions 40 gradually increases from the upstream side (leading edge Le side) toward the downstream side (slit S side). In the example of FIG. 2, an expansion ratio of the width of the hydrophilic region 40 is constant. That is, the figure shows an example in which both a radially outer end edge and a radially inner end edge of the hydrophilic region 40 extend linearly. However, it is also possible to adopt a configuration in which the expansion ratio of the width of the hydrophilic region 40 gradually increases or decreases toward the downstream side, depending on design and specifications.

At an upstream-side end edge of the slit S, the plurality of hydrophilic regions 40 are continuous. In other wards, the upstream-side end edge of the slit S is connected to the hydrophilic regions 40 over the entire region. In other words, the upstream-side end edge of the silt S does not come into contact with the water-repellent region 30.

(Actions and Effects)

Subsequently, an operation of the steam turbine 1 and a behavior of the droplets on the stator blade 10 according to the present embodiment will be described. In operating the steam turbine 1, first, high-temperature and high-pressure steam is introduced into an inside of the casing body 3H through the steam flow path 11. The steam alternately passes through the above-described stator blade rows and rotor blade rows 7 while flowing toward the downstream side inside the casing body 3H. The stator blade row 9 rectifies the flow of the steam to cause the steam to flow into the adjacent rotor blade row 7 on the downstream side. By the steam acting on the rotor blade row 7, torque is applied to the rotating shaft 6 through the rotor blade row 7. Due to this torque, the rotor 2 rotates around the axis Ac. Rotational energy of the rotor 2 is taken out from a shaft end and is used for driving a generator (not shown) or the like.

Here, energy of the steam parsing through the stage in a main flow path of the turbine is converted into rotational energy each time the steam passes through the stage from the upstream side toward the downstream side, resulting in a decrease in temperature (and pressure). Therefore, in the stator blade row 9 on the most downstream side, a portion of the steam is liquefied and exists in an air flow as fine droplets, and a portion of the droplets adheres to the surface of the stator blade 10 (the stator blade body 22). These droplets grow to form a liquid film. Furthermore, when the liquid film flows downstream and increases in thickness as the number of droplets continues to increase, a portion of the liquid film is torn off by the steam flow, or the liquid film that remains adhering to the stator blade row 9 scatters as coarse droplets from the trailing edge of the stator blade. The scattering droplets flow toward the downstream side while gradually accelerating due to the steam flow. When the coarse droplets collide with the rotor blade 8 on the downstream side, erosion may occur on a surface of the rotor blade 8. In addition, the collision of the droplets may hinder rotation of the rotor blade 8 (rotor 2), resulting in braking loss.

Therefore, in the present embodiment, the hydrophilic region 40 is formed on the surface of the stator blade body 22 as described above. The droplets adhering to the stator blade body 22 spread thinly to fit into the hydrophilic region 40 and form, a liquid film. Since there is a difference in hydrophilicity at a boundary between the hydrophilic region 40 and another portion, the liquid film is held inside the hydrophilic region 40. This liquid film rides on the flow of the steam and flows toward the downstream side in the hydrophilic region 40.

Here, the radial dimension of the hydrophilic region 40 gradually increases toward the downstream side. Therefore, an area of the liquid film expands in the hydrophilic region 40 as the liquid film flows toward the downstream side, and the liquid film becomes thinner. Accordingly, a surface of the liquid film becomes more stable than in a case where the liquid film is maintained thick. Therefore, waves are less likely to be generated on the surface of the liquid film, and a probability that the liquid film is torn off by the steam flow is reduced. As a result, the liquid film flows toward the downstream side along the hydrophilic region 40, and is easily collected by the slit S serving as the collecting portion C. Accordingly, the generation of the coarse droplets that are torn off by the steam flow on an upstream side of the slit S and the coarse droplets that jump over the slit S and that scatter from the trailing edge of the stator blade body 22 can be Suppressed. Therefore, a probability that the droplets scatter toward the rotor blade 8 located on the downstream side of the stator blade 10 can be reduced. On the other hand, in a case where the liquid film is torn off by the steam because the liquid film is thick, the liquid film scatters toward the downstream side as coarse droplets, or the liquid film remaining adhering to the stator blade row 9 scatters from the trailing edge of the stator blade as coarse droplets and collides with the rotor blade 8, so that there is a concern that erosion may occur. According to the above configuration, the occurrence of such erosion can be suppressed.

Furthermore, according to the above configuration, the plurality of hydrophilic regions 40 are arranged in plurality in the radial direction. Accordingly, the droplets can be guided to the hydrophilic region 40 in a wider range in the radial direction. In addition, since the steam turbine 1 is generally continuously operated under rated conditions, a region and a path where a liquid film is formed on the surface of the stator blade body 22 are substantially constant, and the liquid film tends to be formed on a side closer to the outer side than the inner side in the radial direction (from the outer periphery-side end portion of the stator blade body 22 to the region of about ½ to ⅔ in the radial direction). For example, when such a region or a path is specified in advance and then the plurality of hydrophilic regions 40 are formed along the path, an area of the hydrophilic regions 40 can be minimized. That is, although the water repellency of the surface on an inner peripheral side of the stator blade body 22 may be higher than that of the water-repellent region 30, this causes excessive processing costs. Therefore, it is desirable that the water-repellent region 30 is formed only on the outer peripheral side on which the hydrophilic regions 40 are formed as described above. As described above, a manufacturing cost and a maintenance cost can be reduced compared to a case where the hydrophilic region 40 is formed in the entire stator blade body 22.

In addition, according to the above configuration, the hydrophilic region 40 extends from the leading edge Le of the stator blade body 22 to the slit 3 serving as the collecting portion C. Accordingly, the liquid film can be stably guided by the hydrophilic region 40 over the entire region from the leading edge Le of the stator blade body 22 to the collecting portion C, and the liquid film can be collected.

In addition, according to the above configuration, the slit 8 serving as the collecting portion C is formed on the trailing edge Te side of the stator blade body 22. The slit S makes it possible to more stably capture and collect the liquid film.

Furthermore, according to the above configuration, at the upstream-side end edge of the slit S, the plurality of hydrophilic regions 40 are continuous. In other words, the end edge is connected to the hydrophilic regions 40 over the entire region. Accordingly, for example, compared to a case where a portion of the end edge is not connected to the hydrophilic region 40, the amount of the liquid film that can be guided to the collecting portion C can be increased, and the liquid film can be more efficiently and stably captured and collected.

Moreover, according to the above configuration, a portion extending in the radial direction to the hydrophilic region 40 is defined as the water-repellent region 30. Accordingly, a difference in hydrophilicity at a boundary between the hydrophilic region 40 and the water-repellent region 30 can be further increased. As a result, a probability that the liquid film adhering to the hydrophilic region 40 moves to the water-repellent region 30 side over the boundary can be reduced. That is, the liquid film is easily held inside the hydrophilic region 40. As a result, a probability that the liquid film deviates from the hydrophilic region 40 is further reduced, and the liquid film can be more smoothly guided to the slit 3 serving as the collecting portion C.

Figure 3:
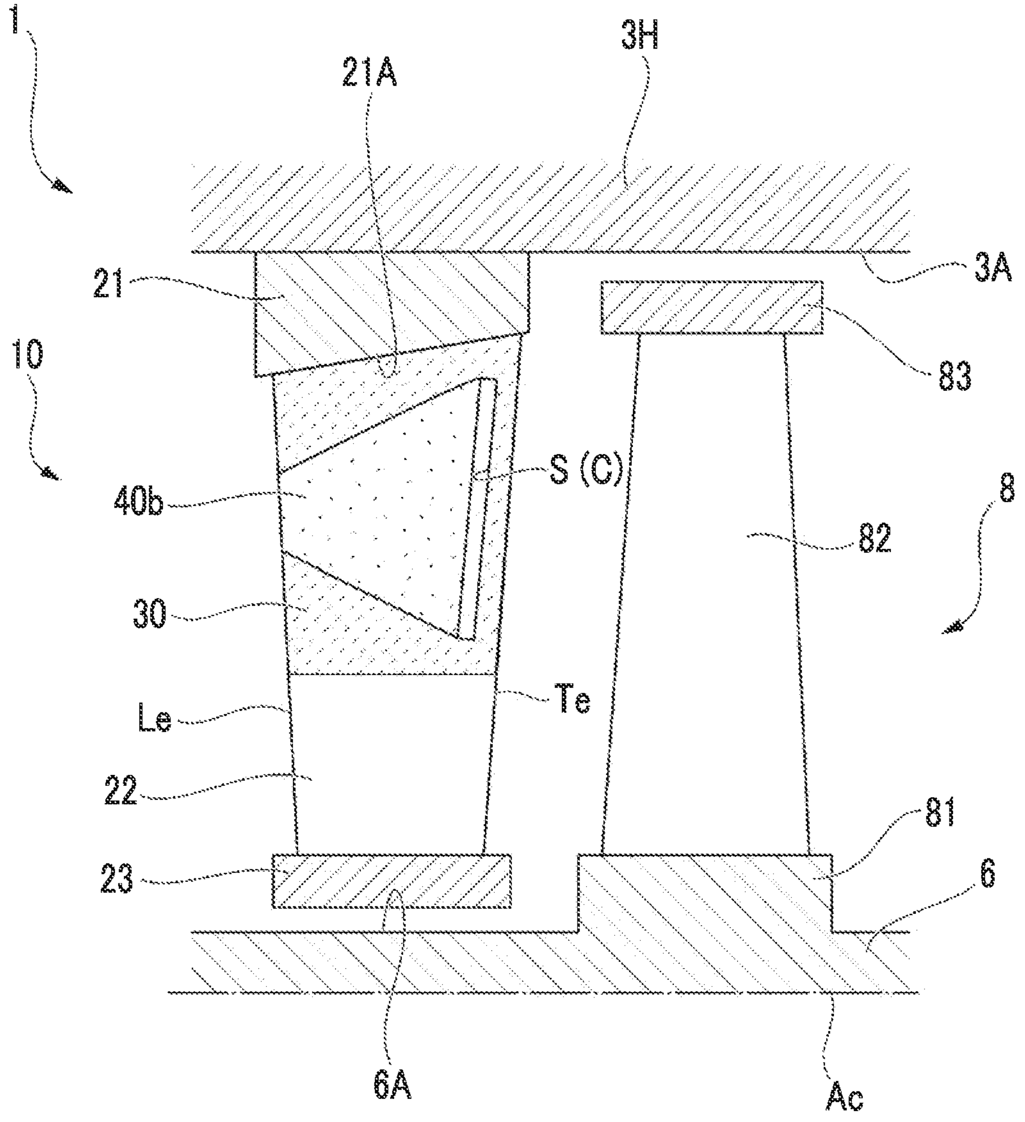
FIG. 3 is an enlarged cross-sectional view of a main part showing a modification example of the steam turbine according to the first embodiment of the present disclosure.

Hereinabove, the first embodiment of the present disclosure has been described. In addition, various changes and modifications of the above-described configuration can be made without departing from the gist of the present disclosure. For example, in the first embodiment, the configuration in which the plurality of (four) hydrophilic regions 40 are arranged in the radial direction has been described. However, the configuration of the hydrophilic region 40 is not limited thereto, and it is also possible to adopt a configuration shown in FIG. 3 as another example. In the example of the figure, only one hydrophilic region **40*b* is formed from the leading edge Le to the slit 3. In addition, a width (radial dimension) of the hydrophilic region 40*b*** also gradually increases from the upstream side to the downstream side. Even with such a configuration, it is possible to obtain the same actions and effects as described above.

Second Embodiment

Figure 4:
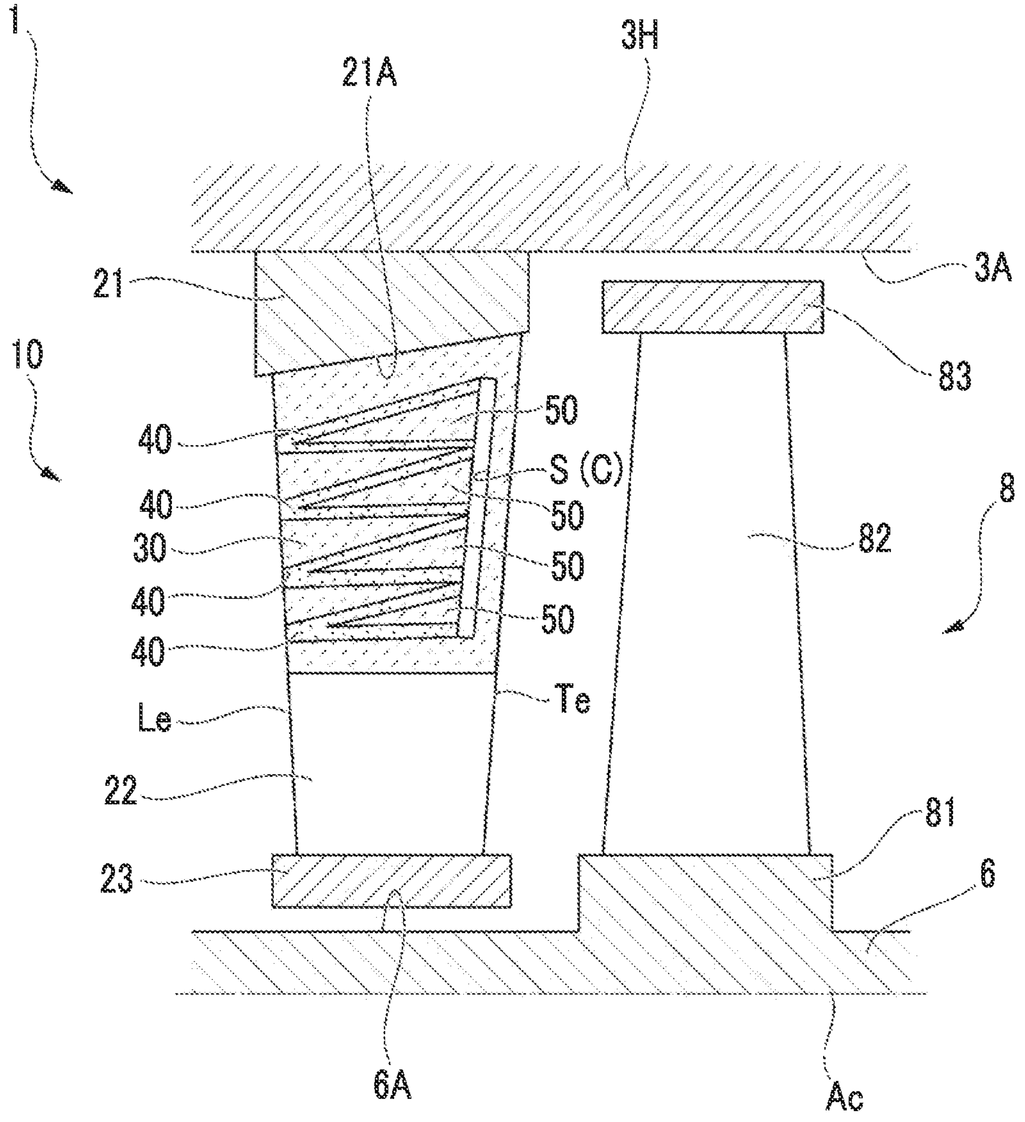
FIG. 4 is an enlarged cross-sectional view of a main part of a steam turbine according to a second embodiment of the present disclosure.

Next, a second embodiment of the present disclosure will be described with reference to FIG. 4. Configurations similar to those in the first embodiment and modification examples thereof are assigned the same reference numerals, and detailed description thereof will be omitted. As shown in the figure, in the present embodiment, a separation zone 50 is formed in each hydrophilic region 40.

The separation zone 50 has water repellency similarly to the water-repellent region 30 described above. The separation zone 50 extends in a triangular shape from a position downstream of the leading edge Le side in the hydrophilic region 40 toward the downstream side. More specifically, a radial dimension of the separation zone 50 gradually increases from the leading edge Le side toward the slit 5 side. Accordingly, the hydrophilic region 40 is partitioned into a plurality of (two) regions in the radial direction, and forms a pair of regions extending in a band shape from the upstream side to the downstream side. The pair of regions extend from the upstream side toward the downstream side so as to be separated from each other on both sides in the radial direction.

According to the above configuration, the separation zone 50 is formed in the hydrophilic region 40. By appropriately adjusting a shape and dimensions of the separation zone 50 in accordance with the behavior of the liquid film in an actual steam turbine 1, a traveling direction of the liquid film in the hydrophilic region 40 can be more precisely controlled. In other words, since the separation zone 50 is formed, the width (radial dimension) of the hydrophilic region 40 becomes relatively small, and a length thereof in an upstream-downstream direction becomes relatively large. Accordingly, when the liquid film is guided from the upstream side to the downstream side, a probability that the flow of the liquid film deviates in the radial direction is reduced, so that it is possible to more stably guide the droplets to the collecting portion C on the downstream side. Accordingly, the probability that the liquid film grows and scatters toward the rotor blade 8 on the downstream side can be further reduced.

Hereinabove, the second embodiment of the present disclosure has been described. In addition, various changes and modifications of the above-described configuration can be made without departing from the gist of the present disclosure. For example, in the second embodiment, an example in which only one separation zone 50 is formed in one hydrophilic region 40 has been described. However, an aspect of the separation zone 50 is not limited thereto, and as another example, it is possible to form two or more separation zones 50 in each hydrophilic region 40.

Third Embodiment

Figure 5:
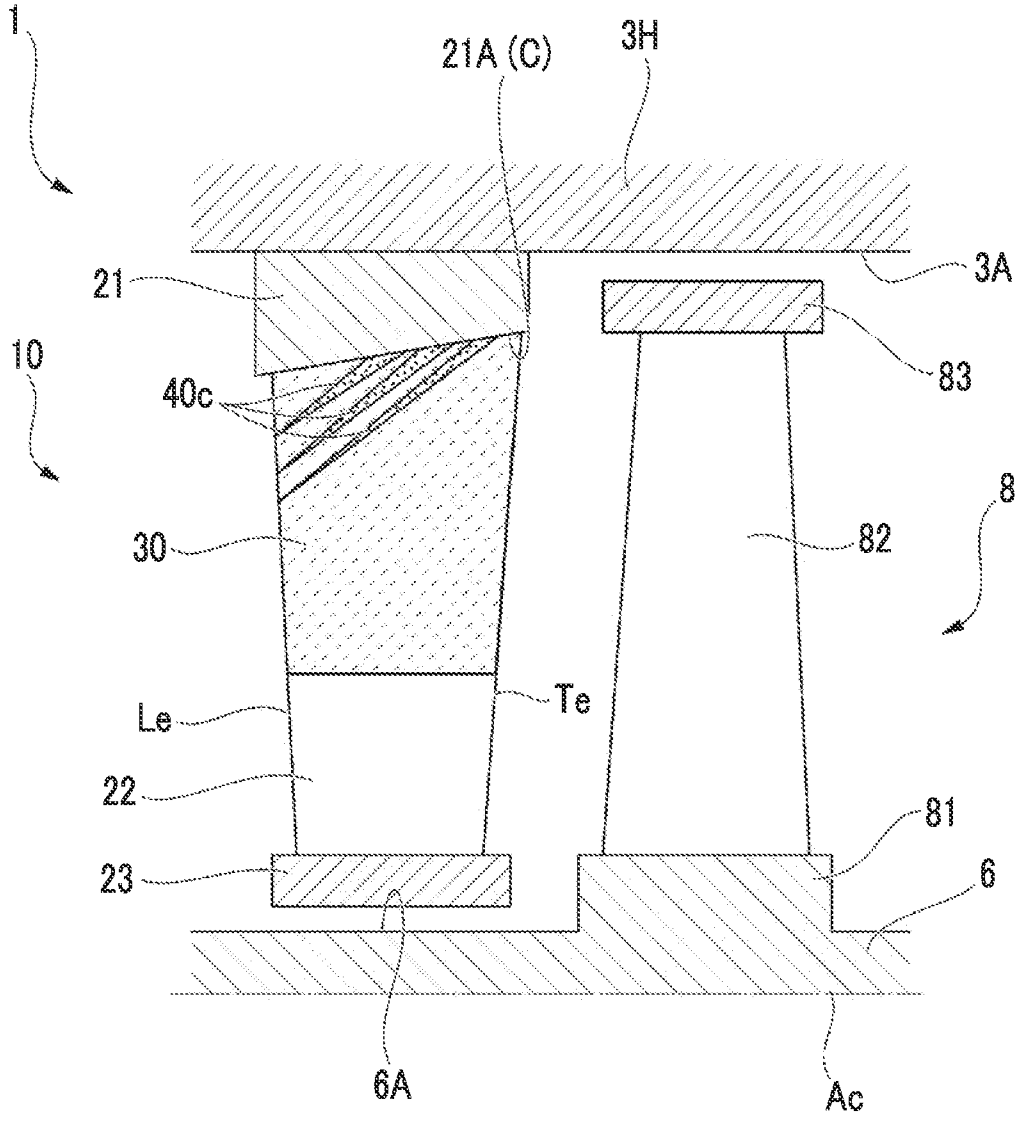
FIG. 5 is an enlarged cross-sectional view of a main part of a steam turbine according to a third embodiment of the present disclosure.

Subsequently, a third embodiment of the present disclosure will be described with reference to FIG. 5. Configurations similar to those in each of the above-described embodiments are assigned the same reference numerals, and detailed description thereof will be omitted. As shown in the figure, in the present embodiment, a shape of a hydrophilic region 40*c* is different front that of each of the above-described embodiments. Furthermore, in the present embodiment, the slit S is not formed in the stator blade body 22.

The hydrophilic region 40*c* extends from the leading edge Le of the stator blade body 22 toward the inner peripheral surface (outer ring inner peripheral surface 21A) of the outer ring 21. That is, the hydrophilic region 40*c* extends radially outward from the upstream side toward the downstream side. The outer ring inner peripheral surface 21A forms a collecting portion C that collects the liquid film that has flowed along the hydrophilic region 40*c*. In the hydrophilic region 40*c*, a width (radial dimension) gradually increases toward the downstream side (the outer ring inner peripheral surface 21A side). A plurality (three as an example) of such hydrophilic regions 40*c* are formed at intervals in the radial direction.

According to the above configuration, the outer ring inner peripheral surface 21A functions as the collecting portion C. That is, the droplets adhering to the stator blade body 22 form a liquid film in the hydrophilic region 40*c*, and then flow toward the outer peripheral side and flow to the outer ring inner peripheral surface 21A. Accordingly, the flow of the liquid film toward the downstream side in the flow direction (main flow direction) of the steam is reduced, and the probability that the droplets scatter toward the rotor blade B on the downstream side can be further reduced. Accordingly, the occurrence of erosion in the rotor blade 8 can be suppressed.

Hereinabove, the third embodiment of the present disclosure has been described. In addition, various changes and modifications of the above-described configuration can be made without departing from the gist of the present disclosure.

Fourth Embodiment

Figure 6:
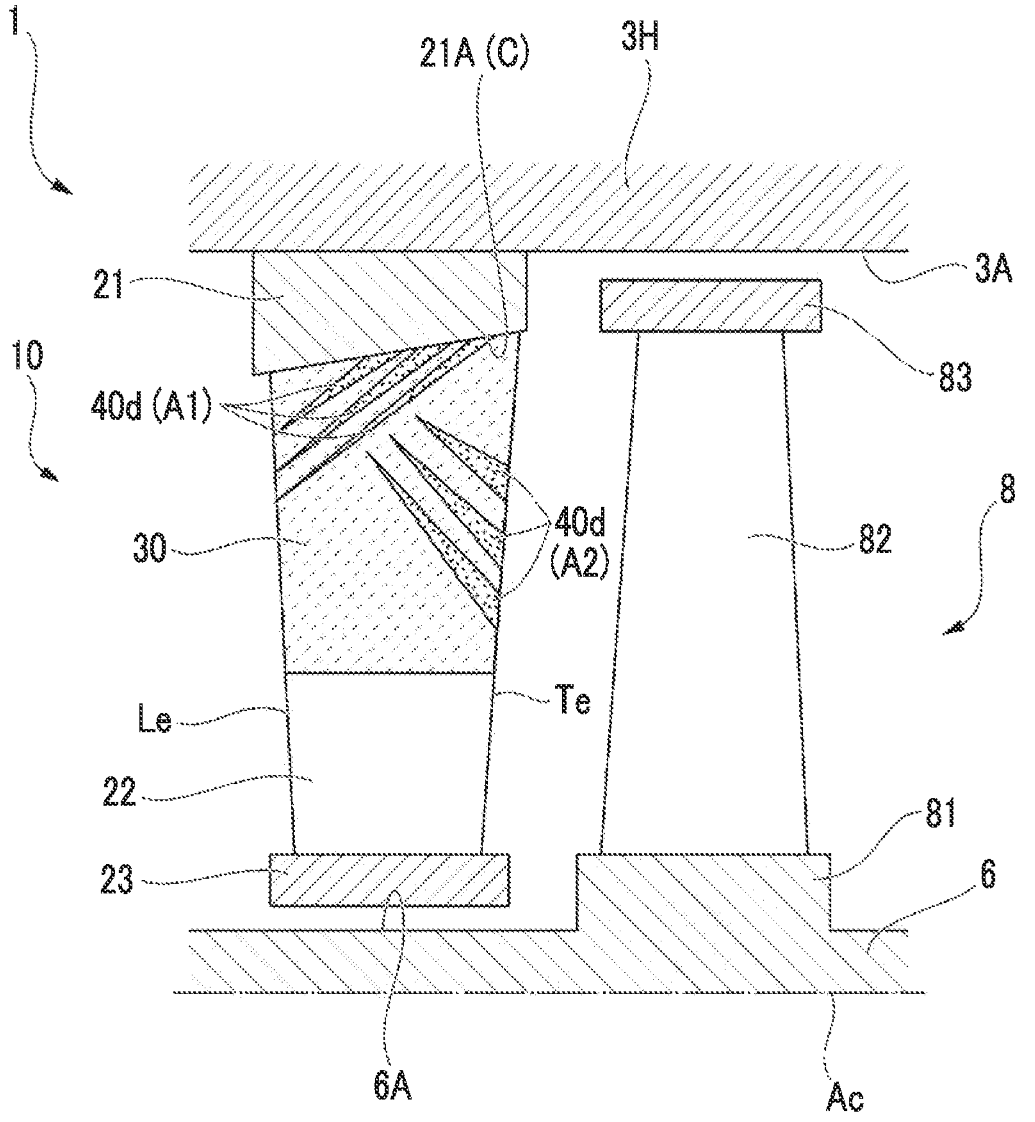
FIG. 6 is an enlarged cross-sectional view of a main part of a steam turbine according to a fourth embodiment of the present disclosure.

Next, a fourth embodiment of the present disclosure will be described with reference to FIG. 6. Configurations similar to those in each of the above-described embodiments are assigned the came reference numerals, and detailed description thereof will foe omitted. As shown in the figure, in the present embodiment, a hydrophilic region 40*d* has a first region A1 having the same configuration as the hydrophilic region 40*c* described in the third embodiment, and a second region A2 formed on an inner peripheral side of the first region A1.

The first region A1 extends from the leading edge Le toward the outer ring inner peripheral surface 21A. On the other hand, the second region A2 extends radially inward from the upstream side toward the downstream side. A plurality of (three as an example) the second regions A2 are arranged at intervals in the radial direction. In addition, an upstream-side end portion of the second region A2 is located in the middle of the first region A1 in an extending direction (a direction including a component in the axis Ac direction). A downstream-side end portion of the second region A2 is located at the trailing edge Te.

According to the above configuration, most of the liquid film can be guided toward the outer ring 21 by the first region A1, and a component of the droplets that cannot be completely captured by the first region A1 or a component deviating from the first region A1 can be captured by the second region A2. The second region A2 extends radially inward toward the downstream side. Accordingly, a probability that the liquid droplet or the liquid film stays in a central portion of the stator blade body 22 in the radial direction is reduced. Even in a case where the liquid film in the second region A2 is torn off and coarse droplets are generated, the coarse droplets can scatter toward an inner periphery-side portion of the rotor blade 8 on the downstream side. Since an inner peripheral side of the rotor blade 8 has a lower circumferential speed than that of an outer periphery-side end portion, thereof, a relative speed with respect to the coarse droplets can be minimized. As a result, even in a case where the coarse droplets collide with the inner peripheral side of the rotor blade 3, it is possible to minimize the probability of erosion.

Hereinabove, the fourth embodiment of the present disclosure has been described. In addition, various changes and modifications of the above-described configuration can be made without departing from the gist of the present disclosure.

<Additional Notes>

The turbine stator blade (stator blade 10) and the strain turbine 1 described in each embodiment are identified as follows, for example.

(1) The turbine stator blade (stator blade 10) according to a first aspect includes: the stator blade body 22 extending in the radial direction intersecting the flow direction of the steam; the hydrophilic region 40, 40*b*, 40*c*, or 40*d* that is formed on the surface of the stator blade body 22, has higher hydrophilicity than other portions, and has a radial dimension gradually increasing toward the downstream side in the flow direction; and the collecting portion C that is provided on a downstream side of the hydrophilic region 40, 40*b*, 40*c*, or 40*d* and that collects a liquid film flowing along the hydrophilic region 40, 40*b*, 40*c*, or 40*d*.

According to the above configuration, the hydrophilic region 40, 40*b*, 40*c*, or 40*d* is formed on the surface of the stator blade body 22. Accordingly, the droplets adhering to the stator blade body 22 spread thinly to fit into the hydrophilic region 40, 40*b*, 40*c*, or 40*d*, and form a liquid film, Since there is a difference in hydrophilicity at the boundary between the hydrophilic region 40, 40*b*, 40*c*, or 40*d* and another portion, the liquid film is held inside the hydrophilic region 40. This liquid film rides on the flow of the stream and flows toward the downstream side in the hydrophilic region 40, 40*b*, 40*c*, or 40*d*. Here, the radial dimension of the hydrophilic region 40, 40*b*, 40*c*, or 40*d* gradually increases toward the downstream side. Therefore, the area of the liquid film expands in the hydrophilic region 40, 40*b*, 40*c*, or 40*d* as the liquid, film flows toward the downstream side, and the liquid film becomes thinner. Accordingly, compared to a case where the liquid film is maintained thick, a probability that the liquid film is torn off by the flow of the steam is reduced. As a result, the liquid film cart be efficiently collected by the collecting portion C, and the probability that the droplets scatter toward the turbine rotor blade (rotor blade 8) located on the downstream side of the turbine stator blade can be reduced.

(2) In the turbine stator blade according to a second aspect, a plurality of the hydrophilic regions 40, 40*c*, or 40*d* arranged in the radial direction are included.

According to the above configuration, the plurality of hydrophilic regions 40, 40*c*, or 40*d* are arranged in plurality in the redial direction. Accordingly, the droplets can be guided to the hydrophilic region 40, 40*c*, or 40*d* in a wider range in the radial direction. In addition, since the steam turbine 1 is generally continuously operated under the rated conditions, a region and a path where a liquid film is formed on the surface of the stator blade body 22 are substantially constant. For example, when such a region or a path is specified in advance and then the plurality of hydrophilic regions 40, 40*c*, or 40*d* are formed along the path, the area of the hydrophilic region 40, 40*c*, or 40*d* can be minimized. Accordingly, the manufacturing cost and the maintenance cost can be reduced compared to the case where the hydrophilic region 40, 40*c*, or 40*d* is formed in the entire stator blade body 22.

(3) In the turbine stator blade according to a third aspect, the hydrophilic region 40, 40*b*, or 40*c* (or the first region A1 of the hydrophilic region 40*d*) extends from, the leading edge Le of the stator blade body 22 to the collecting portion C.

According to the above configuration, the hydrophilic region 40, 40*b*, or 40*c* (or the first region A1 of the hydrophilic region 40*d*) extends from the leading edge Le of the stator blade body 22 to the collecting portion C. Accordingly, the liquid film can be stably guided by the hydrophilic region 40, 40*b*, or 40*c* (or the first region A1 of the hydrophilic region 40*d*) over the entire region from the leading edge Le or the stator blade body 22 to the collecting portion C, and the liquid film can be more efficiently collected.

(4) The turbine stator blade according to a fourth aspect further includes: the separation zone 50 that extends from the position downstream of the leading edge Le side in the hydrophilic region 40 toward the downstream side to partition the hydrophilic region 40 into a plurality of regions.

According to the above configuration, the separation zone 50 is formed in the hydrophilic region 40. By appropriately adjusting the shape and dimensions of the separation zone 50, the traveling direction of the liquid film in the hydrophilic region 40 can be more precisely controlled. In other words, since the separation zone 50 is formed, the width (radial dimension) of the hydrophilic region 40 becomes relatively small, and the length thereof in the upstream-downstream direction becomes relatively large. Accordingly, when the liquid film is guided from the upstream side to the downstream side, the probability that, the liquid film deviates in the radial direction is reduced, so that it is possible to more stably guide the droplets to the collecting portion C on the downstream side.

(5) In the turbine stator blade according to a fifth aspect, the collecting portion C is the slit S that is formed on the trailing edge Te side of the stator blade body 22, extends along the trailing edge Te, and communicates with the inside of the stator blade body 22.

According to the above configuration, the slit S serving as the collecting portion C is formed on the trailing edge Te side of the stator blade body 22. The slit S makes it possible to more stably capture and collect the liquid film.

(6) In the turbine stator blade according to a sixth aspect, a plurality of the hydrophilic regions 40 arranged in the radial direction are included, and at the upstream-side end edge of the slit S, the plurality of hydrophilic regions 40 are continuous.

According to the above configuration, at the upstream-side end edge of the slit S, the plurality of hydrophilic regions 40 are continuous. In other words, the end edge is connected to the hydrophilic regions 40 over the entire region. Accordingly, for example, compared to a case where a portion of the end edge is not connected to the hydrophilic region 40, the amount of the liquid film that does not reach the collecting portion C is reduced, and the liquid film can be more efficiently and stably captured and collected.

(7) The turbine stator blade according to a seventh aspect further includes: the outer ring 21 provided on the outer peripheral side of the stator blade body 22, in which the collecting portion C is the inner peripheral surface (cuter ring inner peripheral surface 21A) of the outer ring 21.

According to the above configuration, the inner peripheral surface of the outer ring 21 functions as the collecting portion C. That is, the droplets adhering to the stator blade body 22 form a liquid film in the hydrophilic region 40*c* (or the first region A1 of the hydrophilic region 40*d*), and then flow toward the outer peripheral side and flow to the inner peripheral surface of the outer ring 21. Accordingly, the flow of the liquid film toward the downstream side in the flow direction (main flow direction) of the steam is reduced, and the probability that the droplets scatter toward the turbine rotor blade on the downstream side can be further reduced.

(8) In the turbine stator blade according to an eighth aspect, the hydrophilic region 40*c* (or the first region A1 of the hydrophilic region 40*d*) extends radially outward from the upstream side toward the downstream side, and is connected to the inner peripheral surface of the outer ring 21.

According to the above configuration, the liquid film can be stably and smoothly guided to the inner peripheral surface of the outer ring 21 along the hydrophilic region 40*c* (or the first region A1 of the hydrophilic region 40*d*).

(9) In the turbine stator blade according to a ninth aspect, the hydrophilic region 40*d* has the first region A1 extending toward the inner peripheral surface of the outer ring 21, and the second region A2 that is formed on the inner peripheral side of the first region A1 and that extends radially inward from the upstream side toward the downstream side.

According to the above configuration, most of the liquid film can be guided toward the cuter ring 21 by the first region A1, and a component of the droplets that cannot be completely captured by the first region A3, caw be captured by the second region A2. The second region A2 extends radially inward toward the downstream side. Accordingly, the probability that the liquid film stays in the central portion oil the stator blade body 22 in the radial direction is reduced. Even in a case where coarse droplets are generated on the trailing edge side due to the liquid film of the second region A2, the coarse droplets can scatter toward the inner periphery-side portion of the turbine rotor blade on the downstream side. Since the inner peripheral side of the turbine rotor blade has a lower circumferential speed than that of the outer periphery-side end portion thereof, a relative speed with respect to the coarse droplets cart be minimized. As a result, even in a case where the coarse droplets collide with the inner peripheral side of the turbine rotor blade, it is possible to minimize the probability of erosion.

In the turbine stator blade according to a tenth aspect, the portion of the surface of the stator blade body 22 extending to at least the hydrophilic region 40, 40*b*, 40*c*, or 40*d* is the water-repellent region 30 having higher water repellency than the hydrophilic: region 40, 40*b*, 40*c*, or 40*d*.

According to the above configuration, the portion extending to the hydrophilic region 40, 40*b*, 40*c*, or 40*d* is defined as the water-repellent region 30. Accordingly, the difference in hydrophilicity at the boundary between the hydrophilic region 40, 40*b*, 40*c*, or 40*d* and the water-repellent region 30 can be further increased. As a result, the liquid film is easily held inside the hydrophilic region 40, 40*b*, 40*c*, or 40*d*, and the probability that the liquid film deviates from the hydrophilic region 40, 40*b*, 40*c*, or 40*d* can be further reduced.

(11) The steam turbine 1 according to an eleventh aspect includes: the rotating shaft 6 that is rotatable around the axis Ac; a plurality of turbine rotor blades (rotor blades 8) arranged on the outer peripheral surface (rotating shaft outer peripheral surface 6A) of the rotating shaft 6 in the circumferential direction with respect to the axis Ac direction; the casing body 3B that covers the rotating shaft 6 and the turbine rotor blade from the outer peripheral side; and a plurality of the turbine stator blades (stator blades 10) which are arranged on the inner peripheral surface of the casing body 38 in the circumferential direction with respect to the axis Ac and which are provided adjacent to the turbine rotor blades in the axis Ac direction.

According to the above configuration, since the growth of the liquid film is suppressed, it is possible to reduce performance degradation and an erosion phenomenon due to the coarse droplets, and it is possible to provide the steam turbine 1 with higher efficiency and higher reliability.

INDUSTRIAL APPLICABILITY

The present disclosure relates to a turbine stator blade and a steam turbine. According to the present disclosure, it is possible to provide a turbine stator blade and a steam turbine capable of further reducing growth of a liquid film and facilitating efficient collection of the liquid film.

REFERENCE SIGNS LIST

1: Steam turbine
2: Rotor
3: Casing
3A: Casing inner peripheral surface
3H: Casing body
6: Rotating shaft
6A: Rotating shaft outer peripheral surface
7: Rotor blade row
8: Rotor blade (turbine sot or: blade)
9: Stator blade row
10: Stator blade (turbine stator blade)
11: Steam flow path
12: Exhaust hood
21: Outer ring
22A: Outer ring inner peripheral surface
22: Stator blade body
23: Inner ring
30: Water-repellent region
40, 40*b*, 40*c*, 40*d*: Hydrophilic region
50: Separation zone
81: Platform
82: Rotor blade body
83: Shroud
A1: First region
A2: Second region
Ac: Axis
C: Collecting portion
Le: Leading edge
S: Slit
Te: Trailing edge

The invention claimed is:

1. A turbine stator blade comprising:
a stator blade body extending in a radial direction intersecting a flow direction of steam;
a hydrophilic region that is formed on a surface of the stator blade body that has a higher hydrophilicity than other portions, and that has a radial dimension gradually increasing from an upstream side of the stator blade body toward a downstream side of the stator blade body in the flow direction;
a plurality of water-repellent regions provided on a portion of the surface of the stator blade body, each water-repellent region having a higher water repellency than the hydrophilic region; and
a collecting portion provided on a downstream side of the hydrophilic region and that collects a liquid film flowing along the hydrophilic region,
wherein the hydrophilic region is arranged between a pair of adjacent water-repellent regions of the plurality of water-repellent regions with respect to the radial direction.

2. The turbine stator blade according to claim 1,
wherein the hydrophilic region is one of a plurality of hydrophilic regions arranged in the radial direction, each hydrophilic region being arranged between a respective pair of adjacent water-repellent regions of the plurality of water-repellent regions with respect to the radial direction.

3. The turbine stator blade according to claim 1,
wherein the hydrophilic region extends from a leading edge of the stator blade body to the collecting portion.

4. The turbine stator blade according to claim 1, further comprising:
a separation zone that extends from a position downstream of a leading edge of the stator blade body in the hydrophilic region toward the downstream side to partition the hydrophilic region into a plurality of regions.

5. The turbine stator blade according to claim 1,
wherein the collecting portion is a slit that is formed on the downstream side of the stator blade body, extends along a trailing edge of the stator blade body, and communicates with an inside of the stator blade body.

6. The turbine stator blade according to claim 5,
wherein the hydrophilic region is one of a plurality of hydrophilic regions arranged in the radial direction, each hydrophilic region being arranged between a respective pair of adjacent water-repellent regions of the plurality of water-repellent regions with respect to the radial direction, and
at an upstream-side end edge of the slit, the plurality of hydrophilic regions are continuous.

7. The turbine stator blade according to claim 1, further comprising:
an outer ring provided on an outer peripheral side of the stator blade body,
wherein the collecting portion is an inner peripheral surface of the outer ring.

8. The turbine stator blade according to claim 7,
wherein the hydrophilic region extends radially outward from an upstream side toward the downstream side, and is connected to the inner peripheral surface of the outer ring.

9. The turbine stator blade according to claim 8,
wherein the hydrophilic region has
a first region extending toward the inner peripheral surface of the outer ring, and a second region that is formed on an inner peripheral side of the first region and that extends radially inward from the upstream side toward the downstream side.

10. A steam turbine comprising:

a rotating shaft that is rotatable around an axis;

a plurality of turbine rotor blades arranged on an outer peripheral surface of the rotating shaft in a circumferential direction with respect to a direction of the axis;

a casing body that covers the rotating shaft and the plurality of turbine rotor blades from an outer peripheral side; and a plurality of the turbine stator blades according to claim 1, which are arranged on an inner peripheral surface of the casing body in the circumferential direction with respect to the axis and which are provided adjacent to the turbine rotor blades in the direction of the axis.

* * * * *